US012360531B2

(12) United States Patent
Fliszar et al.

(10) Patent No.: US 12,360,531 B2
(45) Date of Patent: Jul. 15, 2025

(54) STABILIZATION AND NAVIGATION OF AN AUTONOMOUS DRONE

(71) Applicant: Snap Inc., Santa Monica, CA (US)

(72) Inventors: David G. Fliszar, Manhattan Beach, CA (US); Russell Douglas Patton, Playa Vista, CA (US)

(73) Assignee: Snap Inc., Santa Monica, CA (US)

( * ) Notice: Subject to any disclaimer, the term of this patent is extended or adjusted under 35 U.S.C. 154(b) by 125 days.

(21) Appl. No.: 18/072,997

(22) Filed: Dec. 1, 2022

(65) Prior Publication Data

US 2023/0350414 A1 Nov. 2, 2023

Related U.S. Application Data

(60) Provisional application No. 63/335,439, filed on Apr. 27, 2022.

(51) Int. Cl.
*G05D 1/00* (2024.01)
*B64C 39/02* (2023.01)
(Continued)

(52) U.S. Cl.
CPC ......... *G05D 1/0094* (2013.01); *B64C 39/024* (2013.01); *B64U 10/00* (2023.01);
(Continued)

(58) Field of Classification Search
CPC .... G05D 1/0094; G05D 1/0816; G05D 1/106; G05D 1/122; G05D 1/229; G05D 1/101;
(Continued)

(56) References Cited

U.S. PATENT DOCUMENTS 6,038,295 A 3/2000 Mattes
6,819,982 B2 11/2004 Doane
(Continued)

FOREIGN PATENT DOCUMENTS

AU 2016102409 A4 * 5/2019
CA 2887596 A1 7/2015
(Continued)

OTHER PUBLICATIONS

US 10,656,660 B1, 05/2020, Meisenholder et al. (withdrawn)
(Continued)

*Primary Examiner* — Michael J Zanelli
(74) *Attorney, Agent, or Firm* — Schwegman Lundberg & Woessner, P.A.

(57) ABSTRACT

Systems, computer readable medium and methods for autonomous drone stabilization and navigation are disclosed. Example methods include capturing an image using an image capturing device of the autonomous drone, processing the image to identify an object, and navigating the autonomous drone relative to the object to one or more waypoints. The autonomous drone navigates initially based on a relative location of the autonomous drone from the object. The autonomous drone determines a distance from the object based on an estimated size of the object and a number of pixels of an image sensor the object occupies. The autonomous drone determines a height above a ground to assist in navigation. Additionally, the autonomous drone hovers to determine a windspeed.

20 Claims, 16 Drawing Sheets

(51) Int. Cl.
*B64U 10/00* (2023.01)
*B64U 20/87* (2023.01)
*B64U 101/30* (2023.01)
*G05D 1/222* (2024.01)
*G05D 1/229* (2024.01)
*G05D 1/243* (2024.01)

(52) U.S. Cl.
CPC ............ *B64U 20/87* (2023.01); *G05D 1/0816* (2013.01); *G05D 1/106* (2019.05); *G05D 1/222* (2024.01); *G05D 1/229* (2024.01); *G05D 1/243* (2024.01); *B64U 2101/30* (2023.01); *B64U 2201/10* (2023.01)

(58) Field of Classification Search
CPC ...... B64C 39/024; B64U 10/00; B64U 20/87; B64U 2101/30; B64U 2201/10
See application file for complete search history.

(56) References Cited

U.S. PATENT DOCUMENTS

| | | |
|---|---|---|
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 7,542,073 B2 | 6/2009 | Li et al. |
| 7,971,156 B2 | 6/2011 | Albertson et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,332,475 B2 | 12/2012 | Rosen et al. |
| 8,646,720 B2 | 2/2014 | Shaw |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,225,897 B1 | 12/2015 | Sehn et al. |
| 9,276,886 B1 | 3/2016 | Samaranayake |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,705,831 B2 | 7/2017 | Spiegel |
| 9,723,272 B2 | 8/2017 | Lu et al. |
| 9,742,713 B2 | 8/2017 | Spiegel et al. |
| 9,747,901 B1 | 8/2017 | Gentry |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,102,423 B2 | 10/2018 | Shaburov et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,284,508 B1 | 5/2019 | Allen et al. |
| 10,370,118 B1 | 8/2019 | Nielsen et al. |
| 10,439,972 B1 | 10/2019 | Spiegel et al. |
| 10,501,180 B2 | 12/2019 | Yu |
| 10,509,466 B1 | 12/2019 | Miller et al. |
| 10,514,876 B2 | 12/2019 | Sehn |
| 10,614,855 B2 | 4/2020 | Huang |
| 10,748,347 B1 | 8/2020 | Li et al. |
| 10,768,639 B1 | 9/2020 | Meisenholder et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,120,261 B2 | 9/2021 | Qian et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2007/0250526 A1 | 10/2007 | Hanna |
| 2008/0255842 A1 | 10/2008 | Simhi |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1 | 11/2012 | Syrdal et al. |
| 2012/0287274 A1 | 11/2012 | Bevirt |
| 2013/0056581 A1 | 3/2013 | Sparks |
| 2013/0238168 A1 | 9/2013 | Reyes |
| 2014/0254896 A1 | 9/2014 | Zhou et al. |
| 2015/0022432 A1 | 1/2015 | Stewart et al. |
| 2015/0070272 A1 | 3/2015 | Kim et al. |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0362917 A1 | 12/2015 | Wang et al. |
| 2016/0063987 A1 | 3/2016 | Xu et al. |
| 2016/0161946 A1 | 6/2016 | Wuth Sepulveda et al. |
| 2016/0179096 A1 | 6/2016 | Bradlow et al. |
| 2016/0292886 A1 | 10/2016 | Erad et al. |
| 2016/0307573 A1 | 10/2016 | Wobrock |
| 2016/0336020 A1 | 11/2016 | Bradlow et al. |
| 2017/0031369 A1 | 2/2017 | Liu et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0225796 A1 | 8/2017 | Sun et al. |
| 2017/0228690 A1 | 8/2017 | Kohli |
| 2017/0244937 A1 | 8/2017 | Meier et al. |
| 2017/0320564 A1 | 11/2017 | Kuzikov |
| 2017/0337791 A1 | 11/2017 | Gordon-carroll |
| 2017/0371353 A1 | 12/2017 | Millinger, III |
| 2018/0082682 A1 | 3/2018 | Erickson et al. |
| 2018/0246529 A1 | 8/2018 | Hu et al. |
| 2019/0011921 A1 | 1/2019 | Wang et al. |
| 2020/0140085 A1* | 5/2020 | Deng .................... B64U 30/20 |
| 2020/0241575 A1 | 7/2020 | Meisenholder et al. |
| 2020/0293045 A1* | 9/2020 | Ghiglino Novoa .. G05D 1/0094 |
| 2020/0346753 A1* | 11/2020 | Qian .................... B64U 50/19 |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0362848 A1 | 11/2021 | Spencer |
| 2021/0382503 A1 | 12/2021 | Meisenholder et al. |
| 2021/0382564 A1 | 12/2021 | Blachly et al. |
| 2021/0397000 A1 | 12/2021 | Rodriguez, II |

(56) References Cited

U.S. PATENT DOCUMENTS

| | | | | |
|---|---|---|---|---|
| 2023/0350413 | A1* | 11/2023 | Ishida | G05D 1/0094 |
| 2024/0103537 | A1* | 3/2024 | Lee | G05D 1/106 |

FOREIGN PATENT DOCUMENTS

| | | | | |
|---|---|---|---|---|
| CA | 3072374 A1 * | 2/2018 | | B64C 13/16 |
| CN | 109843720 A * | 6/2019 | | B64C 13/16 |
| WO | WO-2018195883 A1 | 11/2018 | | |
| WO | WO-2023211694 A1 | 11/2023 | | |

OTHER PUBLICATIONS

Ahmed et al.; Towards Selfie Drone: Spatial Localization and Navigation of drone Using Human Pose Estimation; 2021 Intl. Conf. on Robotics and Automation in Industry (ICRAI); Rawalpindi, Pakistan; 2021; pp. 1-7 (Year: 2021).*

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Meisenholder, David, et al., "Remoteless Control of Drone Behavior", U.S. Appl. No. 15/640,143, filed Jun. 30, 2017, 108 pgs.

Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.

"International Application Serial No. PCT/US2023/018470, International Preliminary Report on Patentability mailed Nov. 7, 2024", 9 pgs.

"International Application Serial No. PCT/US2023/018470, International Search Report mailed Jun. 23, 2023", 4 pgs.

"International Application Serial No. PCT/US2023/018470, Written Opinion mailed Jun. 23, 2023", 7 pgs.

"Spark user manual", User Manual V1.6, [Online]. Retrieved from the Internet: <URL: https://manuals.coolblue.nl/e1/dji-spark-wit-collectie.pdf>, (Oct. 1, 2017), 1-56.

* cited by examiner

STABILIZATION AND NAVIGATION OF AN AUTONOMOUS DRONE

PRIORITY CLAIM

This application claims priority under 35 U.S.C. 119(e) to U.S. Provisional Patent Application Ser. No. 63/335,439, filed Apr. 27, 2022, which is incorporated herein by reference in its entirety.

TECHNICAL FIELD

Examples of the present disclosure relate generally to stabilization and navigation of an autonomous drone. More particularly, but not by way of limitation, the present disclosure addresses systems and methods for stabilization and navigation of an autonomous drone after takeoff based on navigating relative to an object in an image captured by the autonomous drone.

BACKGROUND

Autonomous drones that provide photographic services to users are becoming more and more popular. But autonomous drone designs are limited by size and power constraints. And users of autonomous drones continue to demand more and more services from the autonomous drones. Moreover, the autonomous drones need to be safe to use.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Figure 7:
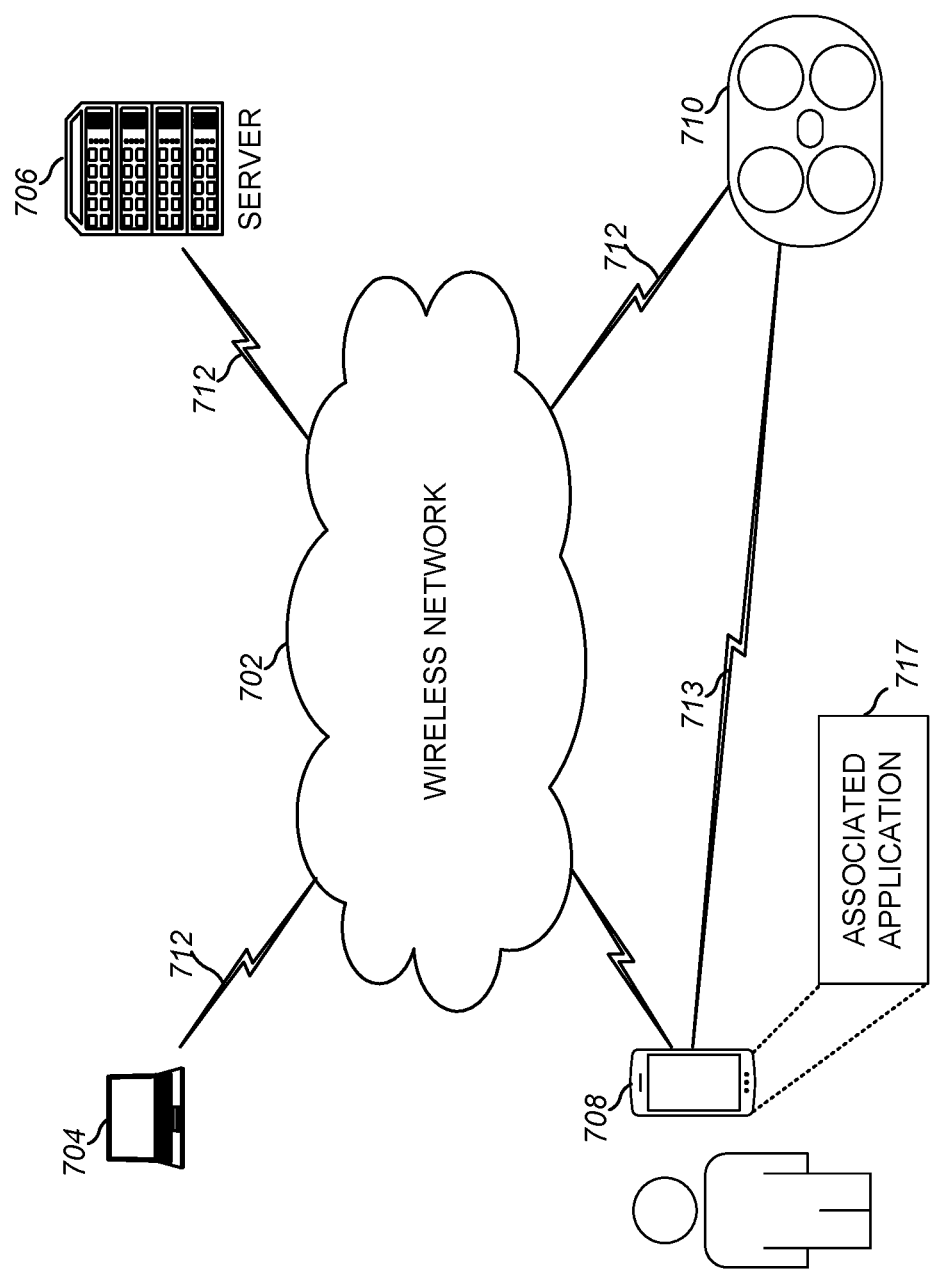
FIG. 7 is a schematic diagram illustrating an autonomous drone system, in accordance with some examples.

An autonomous drone 710, referring to FIG. 7, may not have a GPS or the autonomous drone 710 may be used indoors where the GPS is inoperative. Additionally, other forms of navigation often require multiple sensor readings such as multiple images before they can effectively be used to navigate the autonomous drones.

A challenge is how to control an autonomous drone 710 right after the autonomous drone 710 takes off. The challenge is addressed as follows. The autonomous drone 710 starts off by taking an image of a face or person. The autonomous drone 710 uses the image to determine a distance from the face or person and the autonomous drone 710. The autonomous drone 710 then hovers to stabilize the autonomous drone 710 where the autonomous drone 710 may continue to take images of the face or person or use other sensors to determine whether the autonomous drone 710 is stable. In some examples, the autonomous drone 710 determines a windspeed while hovering to determine whether it is safe to continue to fly. The autonomous drone 710 then navigates to one or more waypoints, which may complete a flight plan for taking a video or may be in preparation for another form of navigation to be used to control the autonomous drone 710.

Networked Computing Environment

Figure 1:
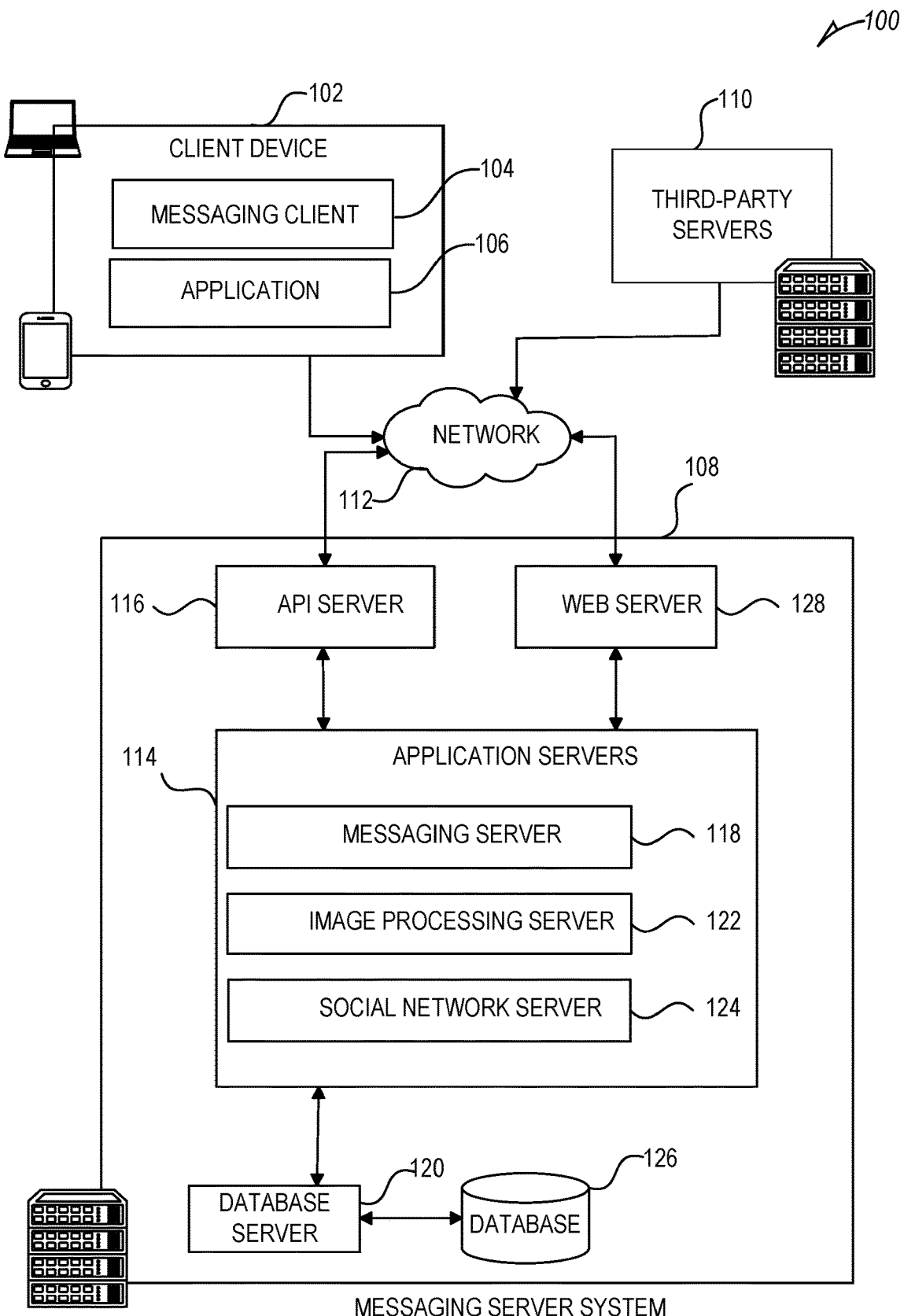
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
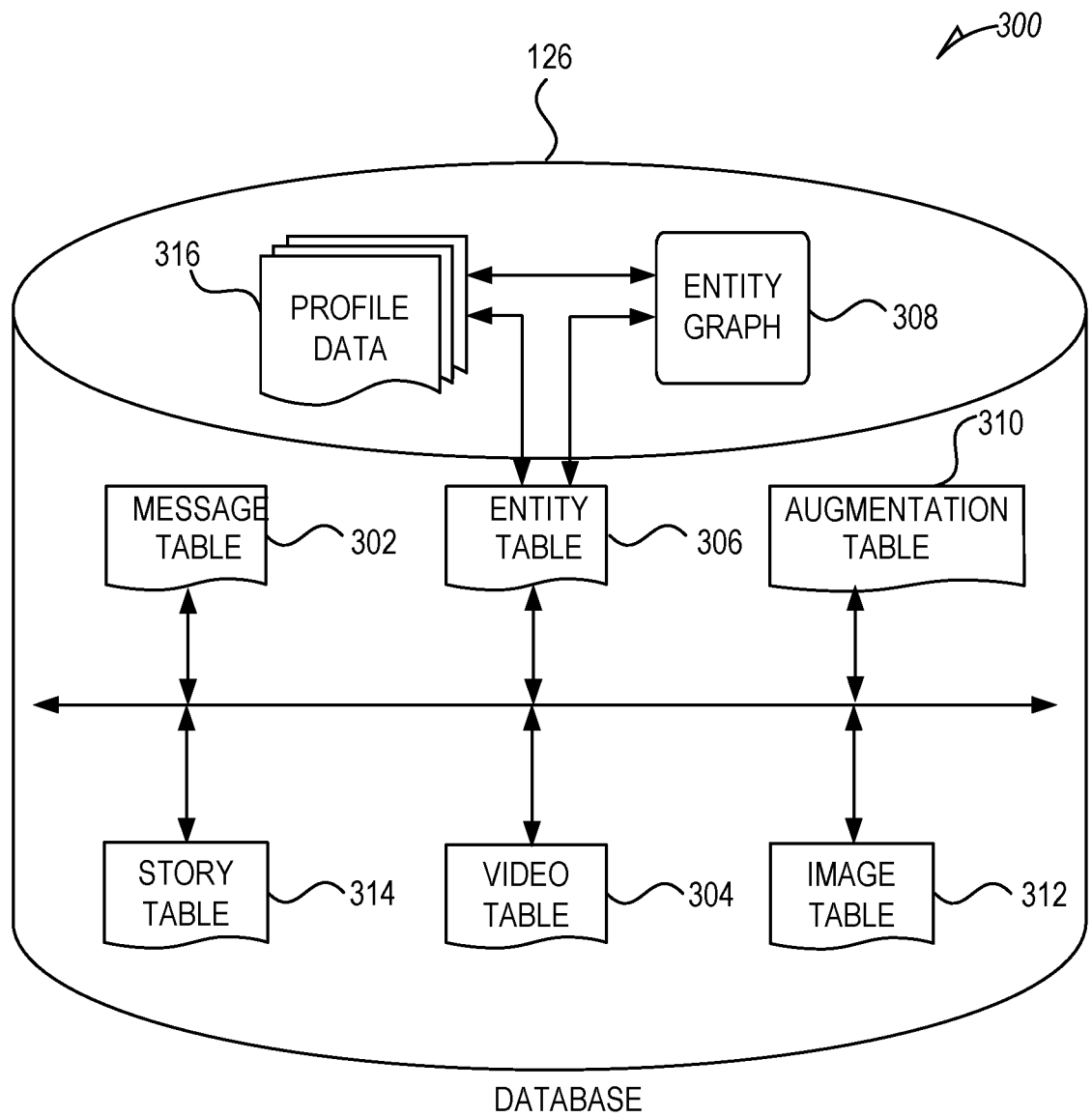
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
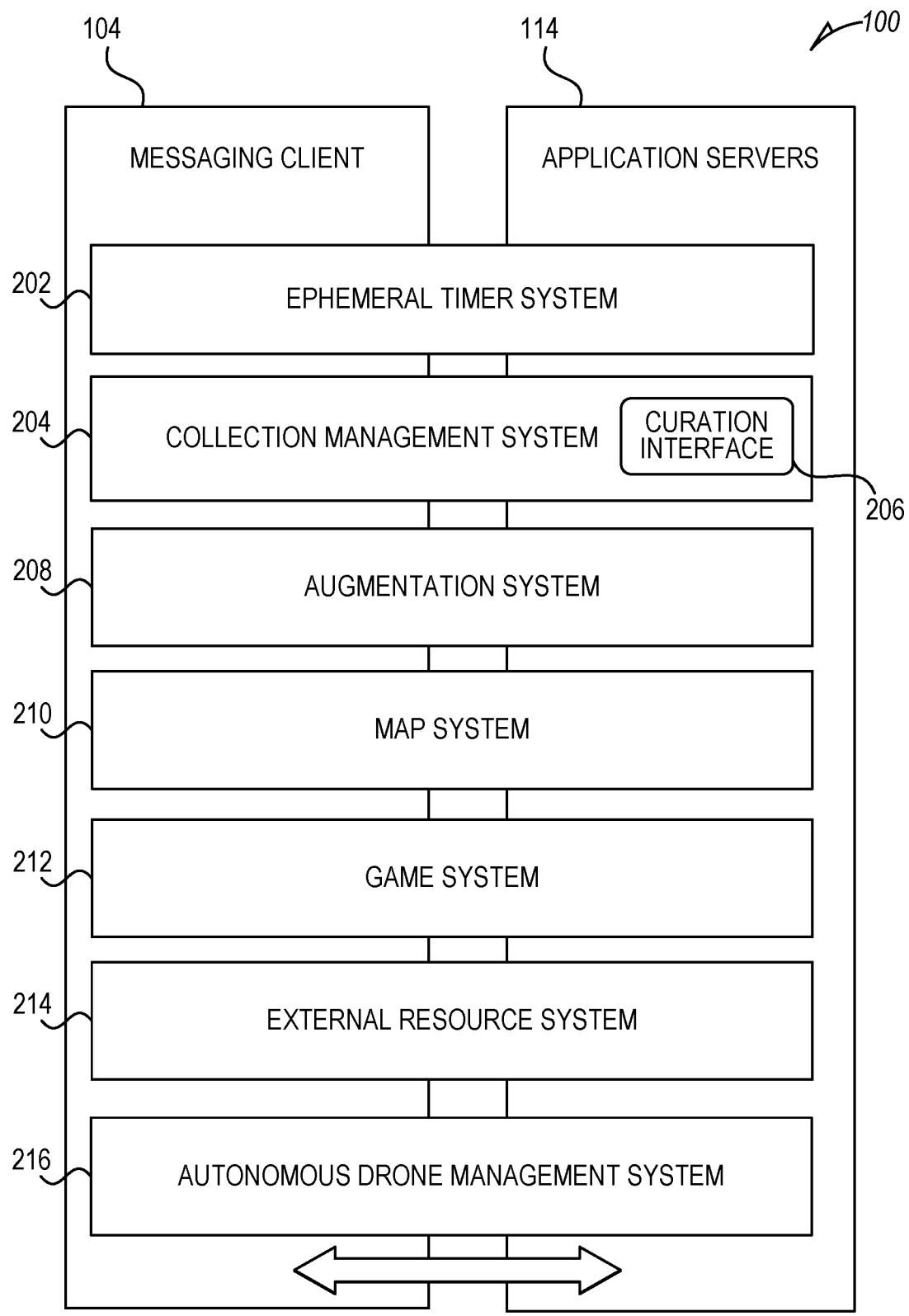
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and an autonomous drone management system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The autonomous drone management system 216 supports, referring to FIG. 7, the off-site client device 704, the server 706, the smartphone 708, and the drone 710, in accordance with some examples. The autonomous drone management system 216 receives requests from the off-site client device 704, the server 706, the smartphone 708, and/or the drone 710, and responds to the requests. In some examples, an associated application 717 is resident in a host device such as the client devices 102, off-site client device 704, server 706, and/or smartphone 708. For example, the associated application 717 enables the user to set thresholds, flight plans for the control knob 614, and other preferences. In some examples, the autonomous drone management system 216 provides functions and routines to assist the control application.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular message, at least message sender data, message recipient (or receiver) data, and a payload. Further details regarding information that may be included in a message and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such methods, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with the use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcasted by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
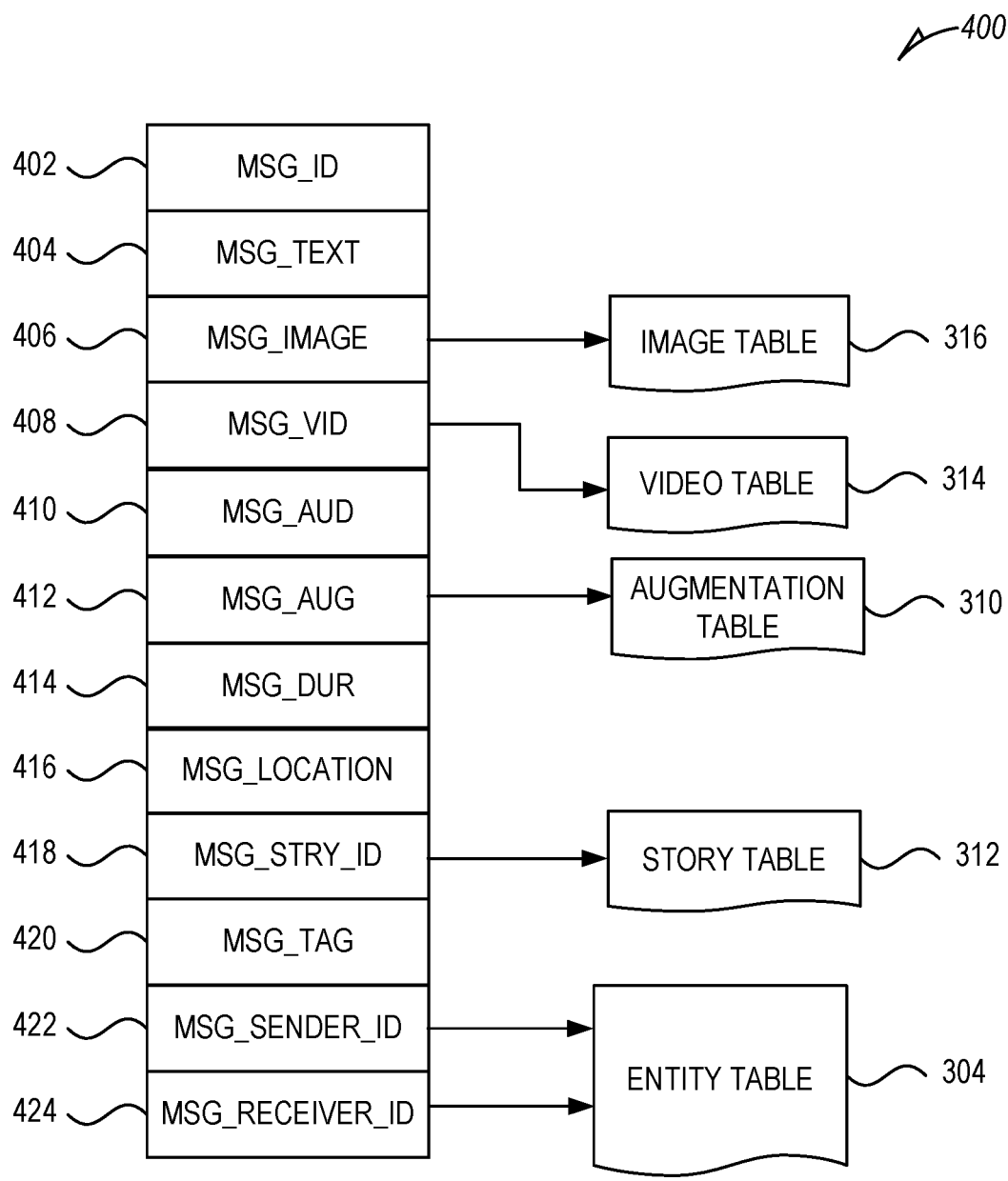
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
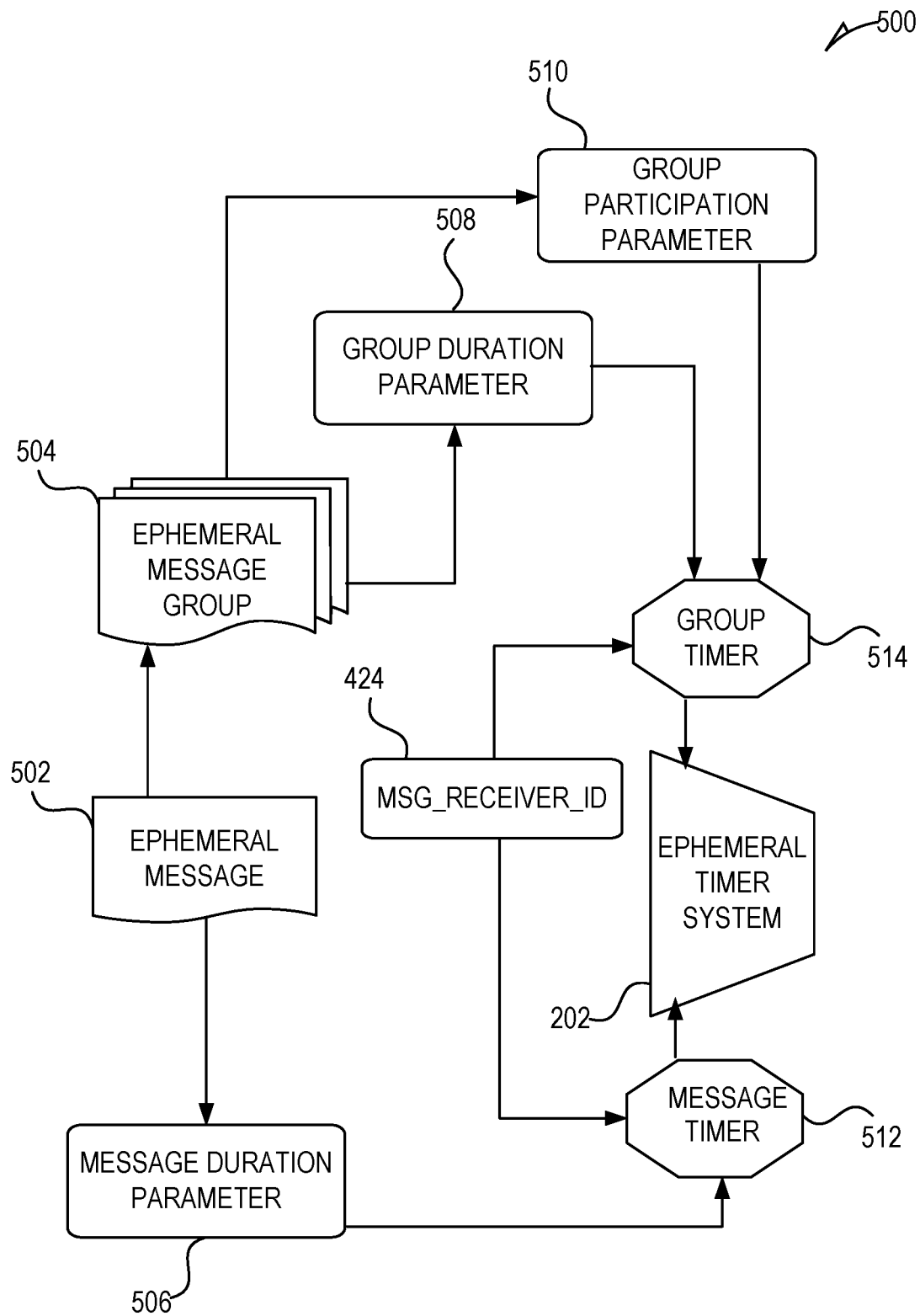
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Stabilization and Navigation of an Autonomous Drone

Figure 6:
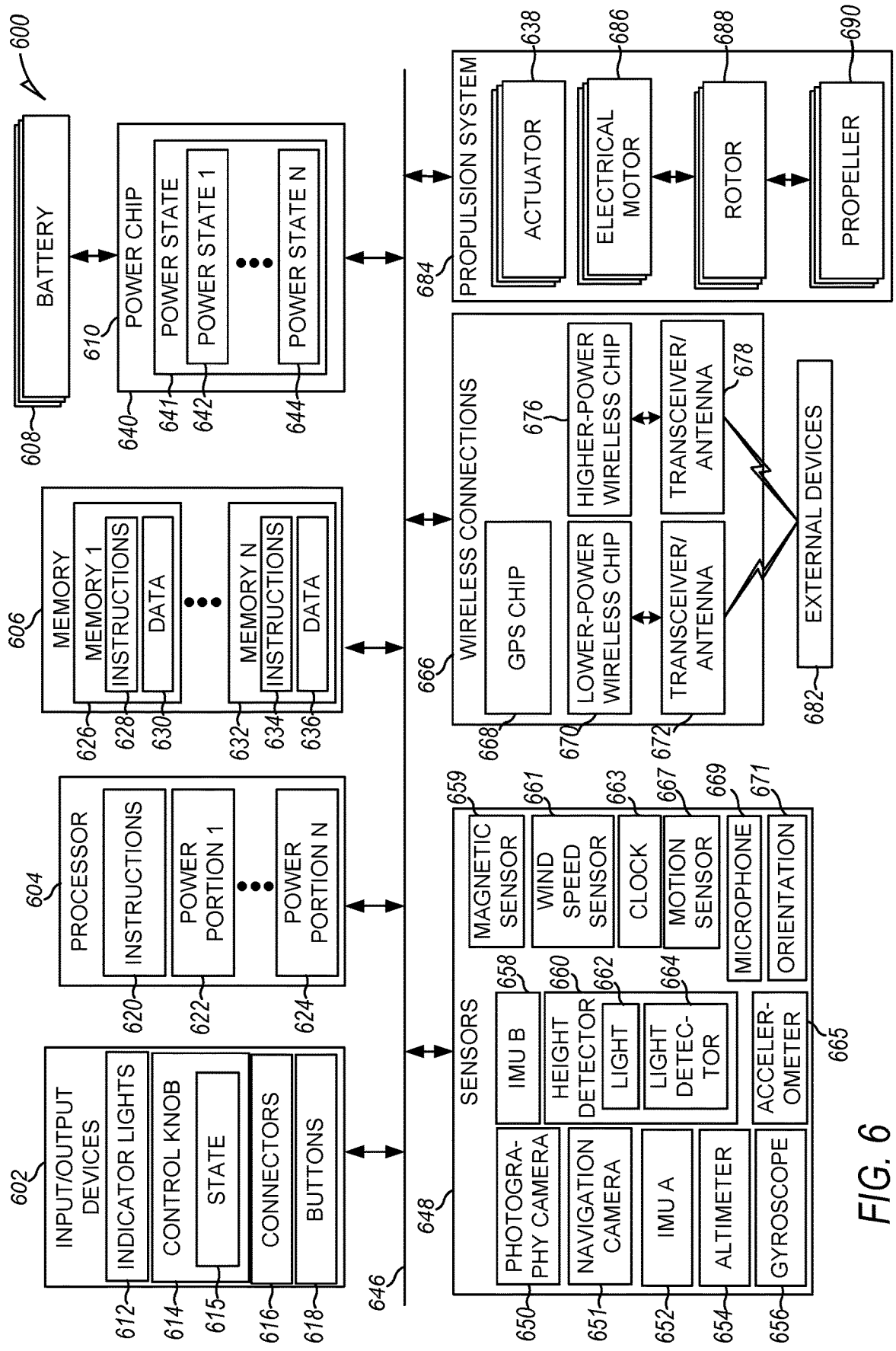
FIG. 6 illustrates examples of components for an autonomous drone, in accordance with some examples.

FIG. 6 illustrates examples of components 600 for an autonomous drone, in accordance with some examples. The components 600 illustrated in FIG. 6 are part of an autonomous drone such as the autonomous drone 710 illustrated in FIGS. 7, 8, 10, and 12. The components 600 are organized into functional groups that include input/output devices 602, a processor 604, memory 606, a battery 608, a power chip 610, sensors 648, wireless connections 666, power and communications connections 646, and a propulsion system 684. One skilled in the art would recognize that the components 600 may be organized into different functional groups or may all individually be part of the autonomous drone.

The components 600 are connected via power and communications connections 646. The power and communication connections 646 include one or more communication buses, power buses, and/or point-to-point connections, in accordance with some examples. Additionally, one or more of the components 600 may be optional. And the components 600 may include additional components. Moreover, the number of the components as illustrated may be different. For example, there may be multiple processors 604. The terms electrical and electronic may be used to refer to either electronical components and/or electronic components.

The propulsion system 684 includes electrical motors 686, where each electrical motor 686 includes a rotor 688 associated with a propeller 690. The propellers 690 provide aerodynamic lift to the autonomous drone 710, as well as to accelerate and rotate the autonomous drone, in accordance with some examples. The electrical motors 686 once actuated in response to signals including electrical motor operation instructions from, for example, the processor 604, spin the rotors 688, which spin the propellers 690. The electrical motors 686 and actuators 638 are powered by the battery 608 and/or power chip 610 and are controlled by signals from the processor 604. The electrical motors 686 are variable electrical motors in accordance with some examples. In some examples, the electrical motors 686 have a low setting, which the processor 604 may use to indicate to a user of the autonomous drone that the autonomous drone is preparing to takeoff.

Having more than one propeller 690 enables the autonomous drone to continue to fly when one or more of the electrical motors 686, rotors 688, or propellers 690 fail. For instance, if one of the electrical motors 686 fails, the autonomous drone 710 can still stay aloft with the remaining electrical motors 686 working in concert to compensate. In some examples, the propulsion system 684 sends a signal to the processor 604 that indicates an electrical motor 686 is not functioning properly. In some examples, the electrical motors 686 provide signals to the processor 604 that indicate whether the electrical motors 686 are operating properly. In addition, the greater the number electrical motors 686 that are incorporated into the autonomous drone, the more lift the autonomous drone 710 will generate, allowing the autonomous drone to carry a heavier payload such as one or more sensors 648.

In some examples, the propulsion system 684 includes one or more actuators 638 that tilt the electrical motors 686 so that the electrical motors 686 may operate at an angle relative to a frame of reference of the autonomous drone. For example, each electrical motor 686 is rotationally mounted on the autonomous drone with a single axis of rotation where the actuator 638 controls the angle of the electrical motor 686. In some examples, each electrical motor 686 is rotationally mounted with two or more axes of rotation controlled by one or more actuators 638. In some examples, one or more actuators 638 control the angle of more than one electrical motor 686.

The functional groups include sensors 648 with components 600 including photography camera 650, navigation camera 651, inertial measurement unit (IMU) A 652, altimeter 654, gyroscope 656, IMU B 658, accelerometer 665, height detector 660, which includes light 662 and light detector 664, magnetic sensor 659, wind speed sensor 661, clock 663, motion sensor 667, microphone 669, orientation 671, and so forth.

In some examples, the sensors 648 generate data that is processed by the processor 604 and stored as data in a memory 606 such as the memory 1 626 as data 630 or memory N 632 as data 636. For instance, the altimeter 654 is an instrument for determining attained altitude. So, when the autonomous drone is set to hover in place, the processor 604 uses the data from the altimeter 654 to determine a height and adjusts the propulsion system 684 to maintain that height.

Alternatively, or in addition, the height detector 660 is used to generate data that can be used to determine the height of the autonomous drone above the ground. For example, the light 662 of the height detector 660 is mounted on the bottom of the autonomous drone to shine light down to the ground which bounces off and hits the light detector 664. The processor 604 uses the data generated from shining the light by the light 662 and receiving the light at the light detector 664 to determine a height of the autonomous drone above a ground based on a time-of-flight of the light and the speed of light. The light 662 is a suitable light source strong enough to produce a detectable reflection from the ground back to the light detector 664. In some examples, the light 662 emits electro-magnetic radiation at a specific wavelength that the light detector 664 is manufactured to detect. In some examples, the height is determined further based on a roll and pitch of the autonomous drone to account for the fact that the light 662 may not be shining light straight down. In some examples, the height detector 660 is based on sonar.

The IMU A 652 and IMU B 658 output measurements such as the autonomous drone's specific force, angular rate, and the orientation of the autonomous drone, using a combination of accelerometers, gyroscopes, and, optionally, magnetometers. The altimeter 654, gyroscope 656, accelerometer 665, and other sensors 648 may be replaced by the IMU A 652 and/or IMU B 658. Various combinations of sensors 648 may be used to generate the data needed to navigate the autonomous drone. In some examples, the sensors 648 include a lidar system, a radar system, a light sensor, or another form of sensor that may be used to assist in navigation and/or photography. In some examples, sensors 648 are included that enable the autonomous drone to determine a pitch, yaw, and roll of the autonomous drone. In some examples, the sensors 648 include a motion sensor 667 that does not require power but generates a signal based on the autonomous drone being moved. The motion sensor 667 may be used to generate an event that the processor 604 responds to.

The photography camera 650 as well as other sensors 648 generate data that may be captured for the purposes of displaying or saving the data for a user of the autonomous drone. The photography camera 650 comprises a digital sensor such as a charged-coupled device (CCD) or a complementary metal-oxide semiconductor (CMOS) that is divided into pixels. The sensor generates an electrical signal based on the light that strikes the sensor. In some examples, the photography camera 650 is mounted horizontally relative to an axis of propellers 690 of the autonomous drone 710 and the navigation camera 651 is mounted vertically relative to the axis of the propellers 690 and is directed downward.

Figure 9:
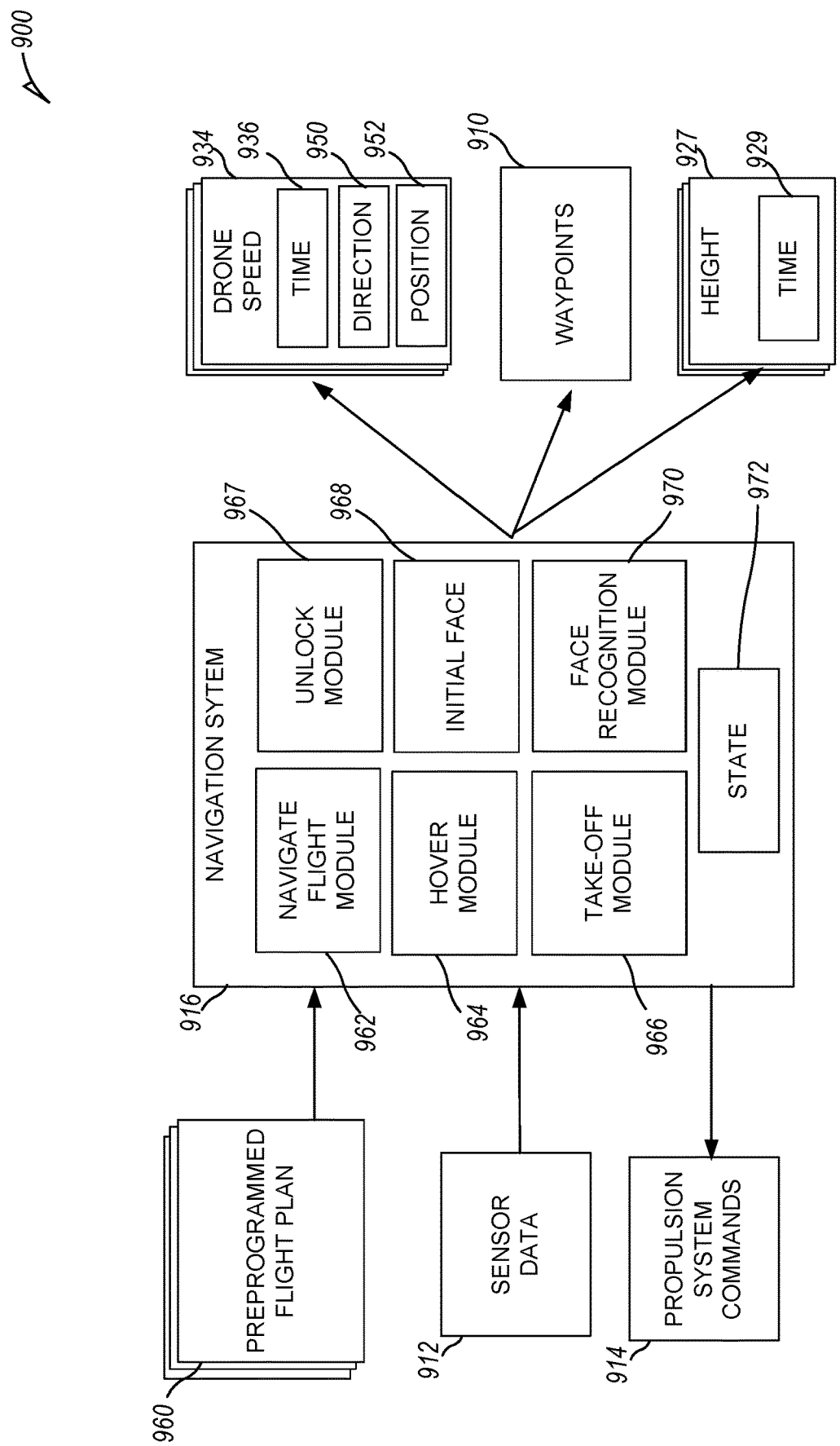
FIG. 9 illustrates a system for stabilization and navigation of an autonomous drone, in accordance with some examples.

In some examples, generated data is associated with, referring to FIG. 9, a position 952 of the autonomous drone 710 and a time 936. In some examples, IMU A 652 is coupled with the photography camera 650, which enables the processor 604 to stabilize the photography camera 650 for improved photography and determine if the photographs are not reliable because the photography camera 650 has not been stable. The photography camera 651 may be rotationally mounted on the body of the autonomous drone, being coupled to the body via one or more actuators or other mechanisms to control orientation of the photography cameras 650 relative to the body of the autonomous drone. The IMU B 658 is attached to the autonomous drone to provide data for navigation. The processor 604 uses the data generated by the IMUs for navigation and, in some examples, to stabilize the photography camera 650. In some examples, there is more than one photography camera 650.

The navigation camera 651 is mounted on a body of the autonomous drone for providing data to assist in navigation of the autonomous drone. There may be more than one navigation camera 651. For example, the navigation may be a front camera that is mounted onto the body of the autonomous drone, where the navigation camera 651 is positioned to pick up images of the scene towards which the autonomous drone is directed. Additionally, or instead of, the navigation camera 651 may be mounted vertically on the body of the autonomous drone, where the navigation camera 651 is positioned to pick up images of the terrain being overflown. The one or more navigation cameras 651 may be movably or fixedly mounted on the body of the autonomous drone, being coupled to the body via one or more actuators or other mechanisms to control orientation of the one or more navigation cameras 651 relative to the body of the autonomous drone. In some examples, the photography camera 650 is also used as a navigation camera 651. In some examples, the photography camera 650 provides a greater pixel resolution and requires more power to operate than the navigation camera 651.

Data such as video and digital images captured by the photography camera 650 and navigation camera 651 may be stored in memory 606 as data 630, 636. Further, data captured by the photography camera 650 and/or navigation camera 651 may be streamed in near-real time wirelessly, using wireless connections, to an external device 682. Additionally, the autonomous drone may send or receive data, which includes instructions, to or from an external device 682.

The magnetic sensor 659 provides data regarding the orientation of the autonomous drone within a magnetic field. The wind speed sensor 661 indicates a wind speed, which may be an apparent wind speed and/or direction, which the processor 604 can use to estimate the true wind speed based on flight characteristics and settings of the autonomous drone such as the power to the electrical motors 686. The clock 663 generates data that indicates a time. In some embodiments, the clock 663 indicates a Greenwich Mean Time. In some embodiments, the clock 663 generates a time relative to an event such as the powering up of the autonomous drone. The microphone 669 turns sound waves into electrical signals that may be stored as data 630, 636 are processed by the processor 604. The orientation 671 is a sensor that indicates the orientation of the autonomous drone 710. For example, the orientation 671 indicates whether the autonomous drone is right side up or upside down.

The wireless connections 666 include one or more wireless protocols that may include radio waves and/or light waves. As illustrated, the wireless connections 666 include a GPS chip 668, a lower-power wireless chip 670 connected to a transceiver/antenna 672, and a higher-power wireless chip 676 connected to a transceiver/antenna 678. The GPS chip 668 is connected to an antenna/transceiver that may either be internal to the chip or external. The GPS chip 668 receives communications from satellites and uses the information from receiving signals from multiple satellites to determine a position of the autonomous drone. GPS chips 668 are higher-power chips 676. In some examples, the processor 604 receives set-up data from an external device 682 that is needed for the operation of the GPS chip 668 where the set-up data may include information about the satellites that the GPS chip 668 receives signals from where the data may include positional information about the satellites. Some examples do not include one or more of the components 600 such as the GPS chip 668.

The lower-power wireless chip 670 may include chips that perform one or more lower-power wireless protocols. For example, Bluetooth Low-Energy (BLE) may be used to communicate with nearer external devices 682. The higher-power wireless chip 676 includes chips that perform one or more higher-power wireless protocols. For example, 3GPP protocols and IEEE 802.11 protocols.

The input/output devices 602 provide input and output to the autonomous drone that may be used by a user. The indicator lights 612 indicate a status of the autonomous drone and are visible to a user of the autonomous drone. For example, the indicator lights 612 may indicate on vs. off, a charge level, a charge state such as charging or not charging, a standby state, whether there are photographs or videos in the memory, whether the memory is full or not, whether the wireless connection 666 is on or off, and so forth. An electronic display such as an LCD display may be in addition to or replace the indicator lights 612. In some embodiments, one of the buttons 618 is a flight button that when pressed indicates to the autonomous drone 710 that it should take off.

The control knob 614, which may take other forms, is a knob mounted on the outside of the autonomous drone providing a user the ability to control the operation of the autonomous drone. The control knob 614 may be termed a control user interface device or another similar term, in accordance with some embodiments. The control knob 614 has a number of positions or states such as off, on, transfer for transferring data such as images out of the autonomous drone, various flight paths and behaviors, and so forth. The state 615 is an internal state that provides the processor 604 with information regarding the setting of the control knob 614. Other input and output user interface items may be used in addition to or instead of the control knob 614.

Connectors 616 are outside connectors that provide either power and/or data connections from external devices 682 to the autonomous drone. For example, there is a power connector 616 for charging the autonomous drone. The power connector 616 or another connector 616 may be used to transfer data to a host device or to receive power from another power source. In some examples, the connector 616 is a wireless rechargeable connector 616 so that the autonomous drone is placed on or near a charging base. In some examples there is a connector 616 for a micro secure digital (SD) card or another external storage device.

In some examples, there are buttons 618 to perform one or more functions. For example, a button 618 that when pressed instructs the autonomous drone to perform whatever function is indicted by the control knob 614 such as take off and take a portrait photograph of the user of the autonomous drone as quickly as possible.

The processor 604 performs instructions 620 to process data 630,636, and/or to control the operations of the autonomous drone. The instructions 620 are machine instructions specifying the operations that the processor 604 is to perform and may be stored in a cache memory that is part of the processor 604 chip. The power portion 1 622 through power portion N 624 indicate that the processor 604 is divided into different portions so that the power chip 610 may select which portions of the processor 604 to provide power to in accordance with different power states 641 of the autonomous drone. Throughout this discussion, the processor 604 is described as the actor in determining various functions but one skilled in the art will recognize that special purpose chips may be included in various components of the autonomous drone to perform specific functions. For example, the height detector 660 may include a processing circuitry that determines the height above the ground and outputs data indicating the height above the ground for consumption by the processor 604.

The memory 606 includes memory 1 626 through memory N 632. Memory 1 626 and memory N 632 includes instructions 628, 634 and data 630, 636, respectively. The memories are accessible to the processor 604 and one or more other components 600 via the power and communication connections 646. A memory of the memory 1 626 through memory N 632 is a main memory that is used for storing data generated by the sensors 648 and for other data such as communications to and from the wireless connections 666. The main memory is a dynamic memory such as a DRAM or RAM, in accordance with some examples. Another memory of memory 1 626 through memory N 632 is a static memory such as a SRAM or ROM that does not need power to maintain a state. In some examples, another memory of memory 1 626 through memory N 632 is a storage unit that is a machine-readable medium. For example, the storage unit is a removable micro SD card. The power chip 610 has connections to different memories so that the power chip 610 may provide power to one or more of the memories of memory 1 626 through memory N 632. The instructions 628, 634, and data 630, 636 reside, completely or partially, within the main memory, static memory, the storage unit, and/or within the processor 604 such as within a cache memory, or any suitable combination thereof. The main memory, static memory, the storage unit, and the memory of processor 604 are examples of machine-readable media.

The autonomous drone may have preprogrammed flight paths or operations that control the flight path and operation of the autonomous drone. For example, referring to FIG. 9, preprogrammed flight plan 960. The preprogrammed flight plans 960 may be associated with positions or states 615 of the control knob 614. The memory 606 stores the preprogrammed flight paths or operations. In some examples, the autonomous drone downloads new preprogrammed flight paths or operations from external devices 682.

Alternatively, or in addition to, movement of the autonomous drone may be controlled by a remote controller such as an external device 682 that is a remote-control device that a pilot or user may use to launch, land, take photographs or video, and navigate the autonomous drone if the autonomous drone is not acting as an autonomous drone. In these embodiments, the autonomous drone is not acting as an autonomous drone but a remote-controlled drone. Remote controllers can take many forms, from gamepad-like controllers to smartphones and tablets. Regardless of their design, remote controllers require communication with the autonomous drone, and typically do that using radio waves. For example, drones are typically run by 2.4 gigahertz radio waves. To communicate with an autonomous drone, many drone controllers use one of the communication protocols of IEEE 802.11, which may be termed Wi-Fi, which can be transmitted on the 2.4 gigahertz spectrum, and is used by smartphones and tablets for communication. In one example, referring to FIG. 7, drone 710 communicates with smartphone 708, using Wi-Fi or BLE®. The external devices 682 include remote-control/host devices such as off-site client device 704, server 706, smartphone 708, or another device.

A power source is required to power the electrical motors 686 and power the other components 600. In some examples, the autonomous drone comprises one or more batteries 608 as sources of power for the components 600 such as the electrical motors 686. The batteries 608 are removable, in accordance with some examples. In some examples, the batteries 608 are rechargeable where one or more connectors 616 connect to the battery 608 either directly or via an electrical or electronic component. In some examples, a power chip 640 manages the batteries 608 by performing various functions such as determining a charge of the batteries 608, turning on or off the recharging, provisioning the output of the batteries 608 with capacitors, resisters, and/or inductors, and so forth. In some examples, the power chip 640 includes a power state 641, which indicates which of the components 600 of the autonomous drone are currently being powered. The power state 641 includes different power states 641 such as power state 1 642 through power state N 644. The different power states 641 provide power to different subsets of the components 600 and, thus, consume different amounts of power and provide different levels of functionality for the autonomous drone as is discussed herein. The different power states 641 are achieved by providing power to different sets of power and communications connections 646. In some examples, the components 600 are included as part of the machine 1400. In some examples, one or more of the components 600 are part of a motherboard with the processor 604 running a real-time operating system or an operating system such as Linux®.

FIG. 7 is a schematic diagram illustrating an autonomous drone system 700, in accordance with some examples. In some examples, the autonomous drone 710 is an autonomous drone or a semi-autonomous drone. The autonomous drone 710 communicates by sending communications 712, 713 using wireless connections 666 of FIG. 6 to the remote-control/host device such as off-site client device 704, server 706, mobile phone or smartphone 708, or another device. The wireless network 702 is a cellular telephone network such as an LTE network, an IEEE 802.11 network, a BlueTooth® network, or another wireless network using another wireless communication protocol. In some examples, the autonomous drone 710 communicates directly with the remote-control/host device via communications 713 where communications 713 are sent using a communication protocol such as the communication protocols discussed for the wireless network 702.

In examples the autonomous drone 710 sends communications 712, 713 that includes data and/or commands or requests to another device such as the smartphone 708. In some instances, communication between the remote-control/host device such as the smartphone 708 and the autonomous drone 710 may be via the wireless network 702. The wireless network 702 may include access to the internet and/or the autonomous drone 710 may access the internet via another connected device such as the smartphone 708.

In some examples, the server 706 provides a social networking service, to enable communication of content such as photos, videos, status updates, media content messages, and the like, directly to social-media sites such as Snapchat® from the autonomous drone 710, which may be in flight. In some examples, the server 706 is messaging server system 108 and the data captured by photography camera 650 of drone 710 is broadcasted or otherwise communicated via a wireless network 702, which may be in near-real time, to a remote-control/host device such as smartphone 708, to servers 706, client devices 704, or another device. The autonomous drone 710 may be in contact with drone management system 216 of FIG. 2 either directly or via another device.

One or more of the remote-control/host devices such as the smartphone 708 may assist in processing of the data such as data 630 by receiving the data wirelessly, processing the data, and then sending back information wirelessly to the autonomous drone 710. For example, the smartphone 708 may receive an image from the autonomous drone 710 and determine that the image is a landmark such as a museum, restaurant, park, national monument, and so forth. The smartphone 708 may send back information that is used by the autonomous drone 710 to assist in a flight path associated with the landmark. The smartphone 708 may contact drone management system 216 to perform the functions for the autonomous drone 710. The autonomous drone 710 may contact the autonomous drone management system 216 by sending commands to the autonomous drone management system 216 such as store data for a user, request a user or purchaser of the autonomous drone, and so forth.

In some examples, the remote-control/host device such as the smartphone 708 includes an associated application 717 that may be used by a user or device to control the autonomous drone 710 or send instructions to the autonomous drone 710 such as return to user, take a particular set flight, move to the left, move to right, move up or down, tilt, take a set of photographs, turn off, and so forth. The associated application 717 may provide real-time or near real-time images of the videos that the autonomous drone 710 is capturing. In some examples, the associated application 717 enables the user to configure the autonomous drone 710 by setting timeouts, conditions, and/or thresholds. Additionally, the user may select configurations regarding the wireless connections 666 to indicate which wireless protocols should be used in which states of the autonomous drone.

In some examples, the remote-control/host device acts as a router or passes through messages or packets to other devices connected to the wireless network 702 directly or indirectly. For example, the smartphone 708 receives an image via communications 713 from the autonomous drone 710. The smartphone 708 takes the image and sends it to server 706 for posting on a social media site, which may be in near-real time. The server 706 may be hosting the autonomous drone management system 216. A remote-control/host device such as the smartphone 708 controls a state of the autonomous drone 710 by sending instructions to the autonomous drone 710 via communications 713, 712, in accordance with some examples.

Figure 8:
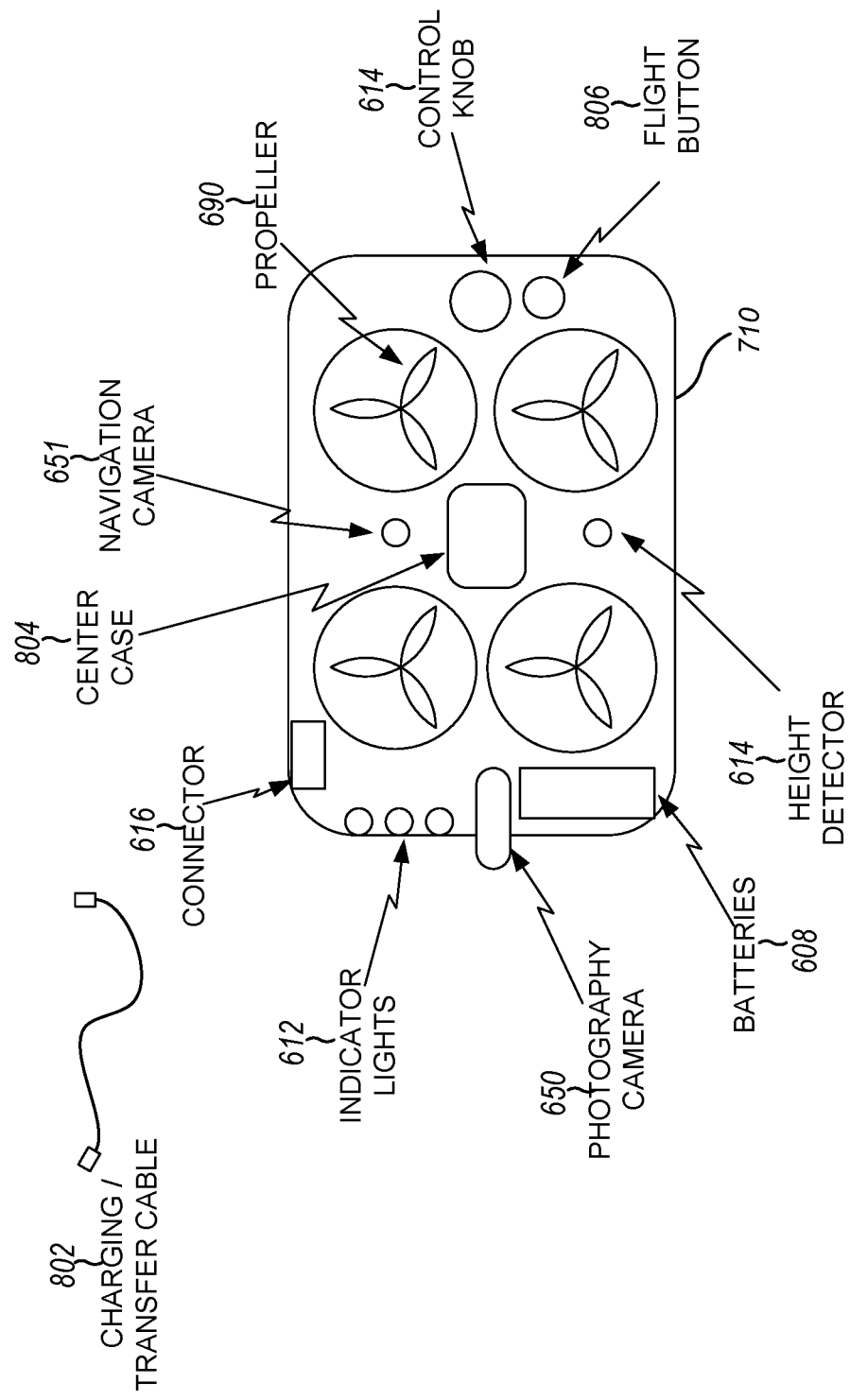
FIG. 8 illustrates an autonomous drone, in accordance with some examples.

FIG. 8 illustrates an autonomous drone 710, in accordance with some examples. The autonomous drone 710 is illustrated from a bottom view of the autonomous drone 710. Referring to FIGS. 6 and 8, the autonomous drone 710 includes propeller 690, control knob 614, which may be on the top, height detector 660, batteries 608, photography camera 650, indicator lights 612, connector 616, center case 804, navigation camera 651, and flight button 806. The charging/transfer cable 802 is plugged into the connector 616. The center case 804 includes various components 600 such as the processor 604, memory 606, wireless connections 666, and so forth. In some examples, the autonomous drone 710 is plastic and approximately six inches in length and four inches in width. In some examples, the autonomous drone 710 is a quadrotor. The flight button 806 is a button 618 that when pressed indicates that the autonomous drone 710 should takeoff and perform a flight plan. The state 615 of the control knob 614 selects the preprogrammed flight plan 960 of FIG. 9, in accordance with some embodiments.

FIG. 9 illustrates a system 900 for stabilization and navigation of an autonomous drone, in accordance with some examples. The navigation system 916 guides the autonomous drone 710 along a flightplans or to waypoints

910. The navigation system 916 is stored in a memory 606 and performed by the processor 604, in accordance with some embodiments.

The navigation system 916 generates the waypoints 910 based on preprogrammed flight plans 960. For example, a preprogrammed flight plan 960 is to fly a couple of feet away from and above a head of a user. The navigation system 916 has to determine a waypoint 910 that conforms to the preprogrammed flight plan 960. The preprogramed flight plans 960 include flight plans 960 for the autonomous drone 710 to follow to start the navigation system 916 such as to go to waypoints 910 and hover. The preprogrammed flight plan 960 includes a target distance from a person associated with the face and a target height of the autonomous drone above a ground.

The sensor data 912 is data that is generated by the sensors 648 and/or other components 600 such as the wireless connections 666. The sensor data 912 also includes information regarding the input/output devices 602 such as the state 615 of the control knob 614. The propulsion system commands 914 includes determining a power for the electrical motors 686 and actuator 638 positions.

In some examples, the navigation system 916 determines an autonomous drone speed 934, which is associated with a time 936, direction 950, and a position 952. A velocity of the autonomous drone 710 is the autonomous drone speed 934 and the direction 950. In some examples, the navigation system 916 provides for the autonomous drone 710 to be fully autonomous where the autonomous drone 710 takes off, flies, lands, and, optionally, captures images or video, without additional input from an electronic control device external to the autonomous drone 710.

In some examples, the navigation system 916 determines the autonomous drone speed 934 or velocity based on images from the navigation camera 651, which is in a vertical position, and, in some examples, based further on height estimates using the altimeter 654 or another sensor 648. In some examples, the navigation system 916 the autonomous drone speed 934 or velocity using dead reckoning using the sensor data 912. One skilled in the art will recognize that the autonomous drone speed 934 may be determined in other ways using the sensor data 912.

The navigation system 916 determines the wind speed either directly by a sensor such as wind speed sensor 661 or based on a difference in an expected velocity of the autonomous drone 710 compared with an actual velocity of the autonomous drone 710. In some examples, the navigation system 916 determines the wind speed by the autonomous drone 710 hovering in place and determining an electrical power applied to the electrical motors 686 to keep the autonomous drone 710 in one place hovering.

In some examples, the navigation system 916 determines the velocity of the autonomous drone 710 based on differences in locations of the autonomous drone 710, which may be based on a GPS chip 668 or objects detected in images. In some examples, the navigation system 916 determines the location of the autonomous drone 710 based on a wireless protocol such as IEEE 802.11 where messages are sent between the autonomous drone 710 and one or more hosts to determine a location of the autonomous drone 710. In some examples, the navigation system 916 determines the location of the autonomous drone 710 based on a location of a host such as a smartphone 708 and information about a distance the autonomous drone 710 is from the smartphone 708, which may be coupled with a height above the ground to determine coordinates of the location of the autonomous drone 710.

The navigation system 916 determines the height 927 based on the sensor data 912 such as from the navigation camera 651, the height detector 660, or another component 600. The height 927 is associated with a time 929. The navigation system 916 may determine the autonomous drone speed 934 and height 927 in different ways. The time 929 associated with the height 927 and the time 936 associated with the autonomous drone speed 934 is generated by a clock 663. The navigation system 916 includes a state 972, which indicates a goal or purpose of the autonomous drone 710 or navigation system 916. For example, a state 972 is an initial flying state where the autonomous drone 710 stabilizes and navigates to one or more waypoints 910.

The face recognition module 970 recognizes faces. The face recognition module 970 is based on neural networks, feature recognition and placement, or another method. In some examples, the face recognition module 970 after identifying the initial face 968, uploads the initial face 968 to a server such as autonomous drone management system 216, which trains a neural network to recognize the face in the initial face 968 and downloads weights to the autonomous drone 710 to make the process of identifying the initial face 968 in subsequent images easier.

The face recognition module 970 determines an initial face 968. The initial face 968 may include more than just the face of a person but also the body of the person. The unlock module 967 unlocks or turns the autonomous drone 710 on based on sensor data 912. In some examples, the unlock module 967 receives an indication of a selection of a flight button 806, and in response sends a command to the photography camera 650 to capture an image, which is processed by the face recognition module 970. If the face recognition module 970 determines there is a suitable face in the image, then the unlock module 967 unlocks the autonomous drone 710 for flight. The take-off module 966 is called to initiate the flight. In some examples, the unlock module 967 does not receive a command from an external electronic control indicating the autonomous drone 710 should be unlocked. The unlock module 967 unlocks the autonomous drone 710 based on a user interacting with input/output devices 602 of the autonomous drone 710.

The take-off module 966 performs initial navigation for the autonomous drone 710. The take-off module 966 sends propulsion system commands 914 to lift the autonomous drone 710 into flight on an initial flight plan. The navigate flight module 962 determines the waypoint 910, which is based on the preprogrammed flight plan 960. In some examples, a first waypoint 910 is to liftoff several inches to several feet and then hover. The navigation flight module 962 navigates the autonomous drone 710 along to the waypoints 910 based on receiving sensor data 912 and sending propulsion system commands 914.

The hover module 964 hovers the autonomous drone 710 after the take-off module 966 has caused the autonomous drone 710 to lift or taken off and at other times. The hover module 964 examines objects or faces in images and uses other sensor data 912 such as a height above ground to cause the autonomous drone 710 to hover. For example, the hover module 964 examines subsequent images captured by the photography camera 650 to keep the initial face 968 at a constant distance from the autonomous drone 710. The hover module 964 uses other sensor data 912 to determine if it is remaining in place (or at a constant location) such as images from the navigation camera 651, which can be used to see if the autonomous drone 710 has moved. The navigation system 916 has been described with various functions performed by several modules but one skilled in the art would recognize that the functions performed by the several modules and the number of modules may be different or there may be no separate modules.

Figure 10:
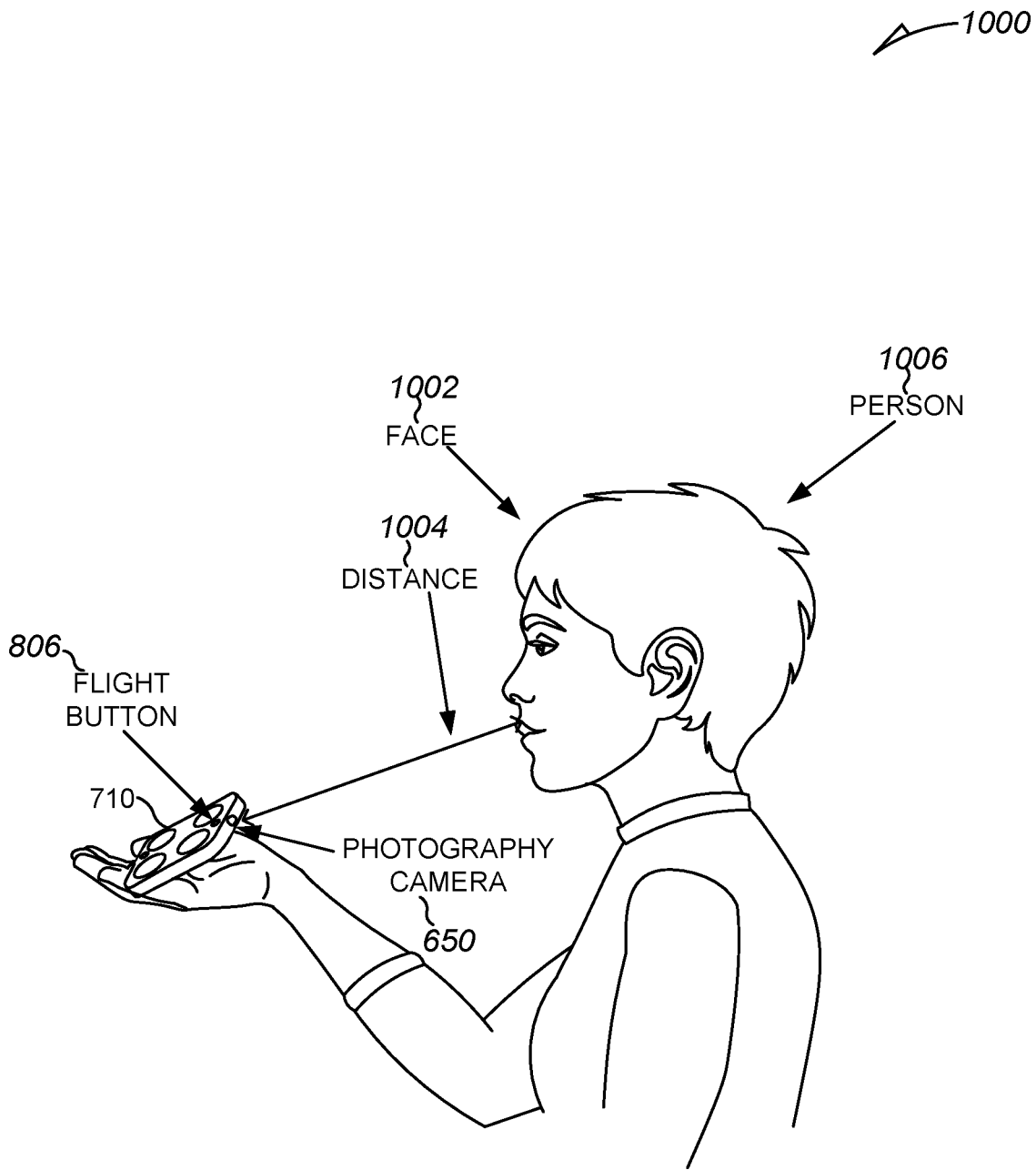
FIG. 10 illustrates unlocking the autonomous drone, in accordance with some embodiments.

FIG. 10 illustrates unlocking 1000 the autonomous drone, in accordance with some embodiments. The person 1006 presses the flight button 806 and points the photography camera 650 towards their face 1002. The face recognition module 970 determines whether the face 1002 is suitable as an initial face 968, which is based on the distance 1004 of the face 1002 from the autonomous drone 710. The unlock module 967 unlocks the autonomous drone 710 and recognizes the combination of the face 1002 with the pressing of the flight button 806 as a "fly instruction", which transitions the navigation system 916 to the take-off module 966.

Figure 11:
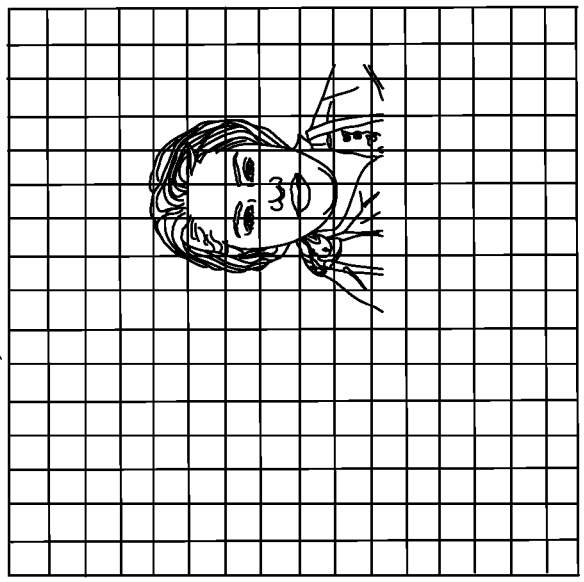
FIG. 11 illustrates images of faces, in accordance with some embodiments.
Figure 11:
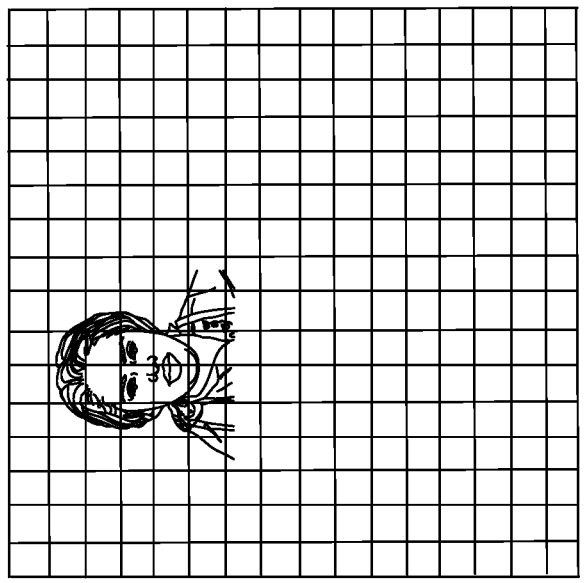

FIG. 11 illustrates images of faces 1100, in accordance with some embodiments. The navigation system 916 is configured to estimate a distance 1004 the autonomous drone 710 is from the face 1002 based on the image of the face 1102 or the image of the face 1106. The image may be termed a captured image. The size or estimated size of a face is estimated based on standard face sizes. The number of pixels that the image of the face 1102 or the image of the face 1106 occupy of the image sensor 1104 or image sensor 1108, respectively, is used to estimate the distance 1004. Additional or subsequent images are captured after the initial face 968 and the navigation system 916 can estimate a distance from the autonomous drone 710 to the face. In some examples, the navigation system 916 is configured to estimate the distance for objects such as a body of person, a chair, or another object where the approximate size of the object may be estimated.

Figure 12:
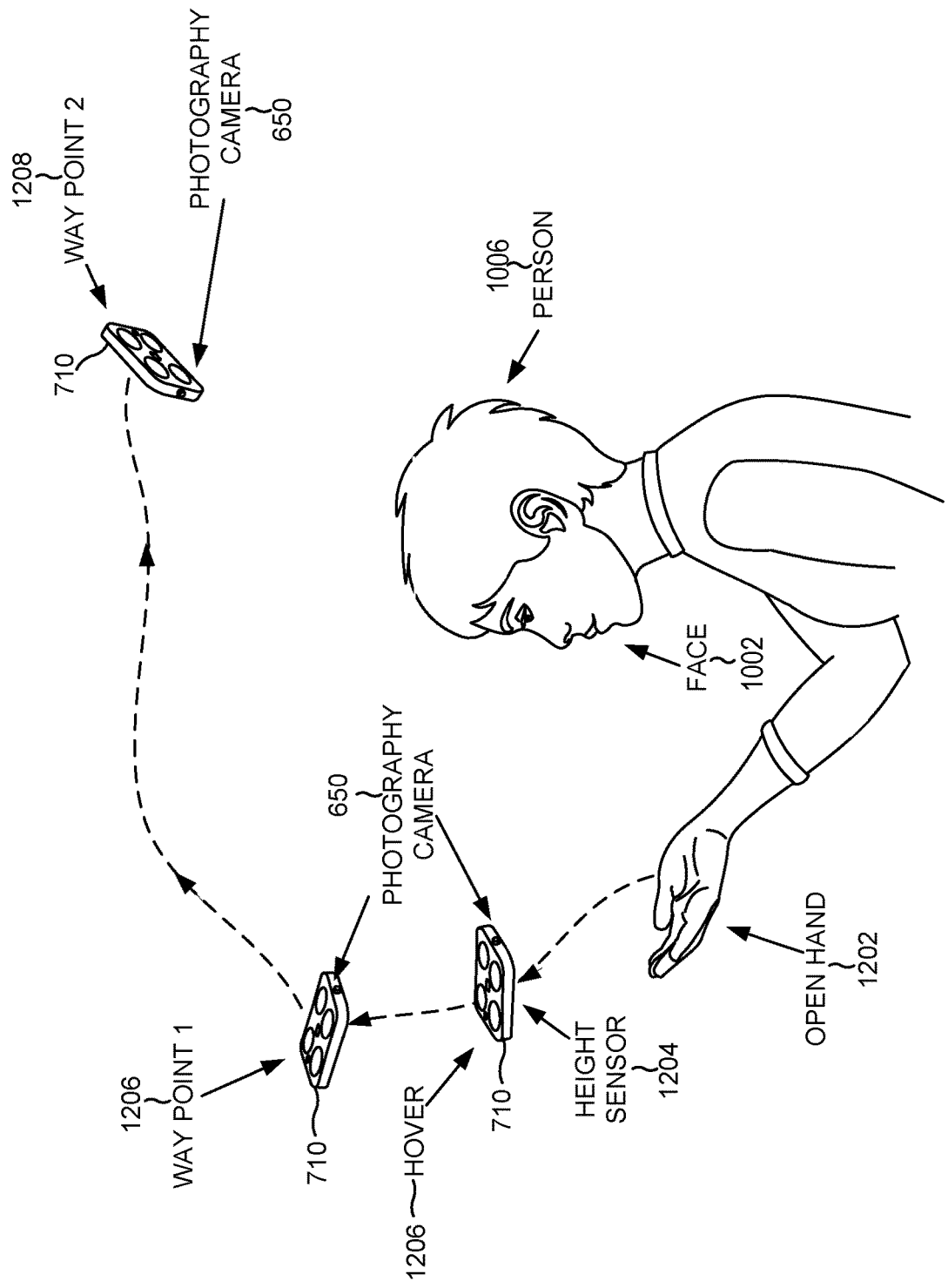
FIG. 12 illustrates an autonomous drone flying, in accordance with some embodiments.

FIG. 12 illustrates an autonomous drone 710 flying, in accordance with some embodiments. The autonomous drone 710 has flown out of the open hand 1202 to the hover 1206 location. The take-off module 966 initially navigated the autonomous drone 710 to fly above the open hand 1202. The hover module 964 took over and flew the autonomous drone 710 to hover 1206. The hover module 964 uses one or more of the images from the photography camera 650, images from the navigation camera 651, and data from the height sensor 1204 to hover. The hover module 964 makes an initial determination if it is safe to fly by attempting to hover in place in a stable manner. The hover module 964 uses the power need to hover to determine a windspeed. The hover module 964 lands in place if the windspeed is too strong to fly or above a threshold value such as 10 MPH, which is indicated in that the hover module 964 has difficulty keeping the autonomous drone 710 stable or in one location. The initial portion of the flight may be a bit unpredictable as the person 1006 may move their hand or launch the autonomous drone 710. So, the initial hover 1206 may be performed at different locations in accordance with how the autonomous drone 710 took off from the open hand 1202 or another location.

The navigate system 916 then determines a waypoint 910 such as waypoint 1 1206 and navigates the autonomous drone 710 to waypoint 1 1206, which may be fly to one foot above the person 1006 and two feet in front of the face 1002. The navigation system 916 causes the photography camera 650 to continue to take images that are used to determine a location of the autonomous drone 710 relative to the person 1006 or face 1002. Another object or additional objects may be used other than the person 1006 or face 1002. The navigation system 916 then determines waypoint 2 1208 and navigates to waypoint 2 1208, which may be to move to a side position of the person 1006 and maintain the same altitude and distance from the person 1006. The navigation camera 651 is taking images during the navigation to begin to start navigation beyond the frame of reference or orientation of the person 1006 or face 1002. There may be other waypoints 910 before the navigation system 916 switches to a different type of navigation or the navigation system 916 may just use the frame of reference or orientation of the person 1006 or face 1002 to perform a flight.

Figure 13:
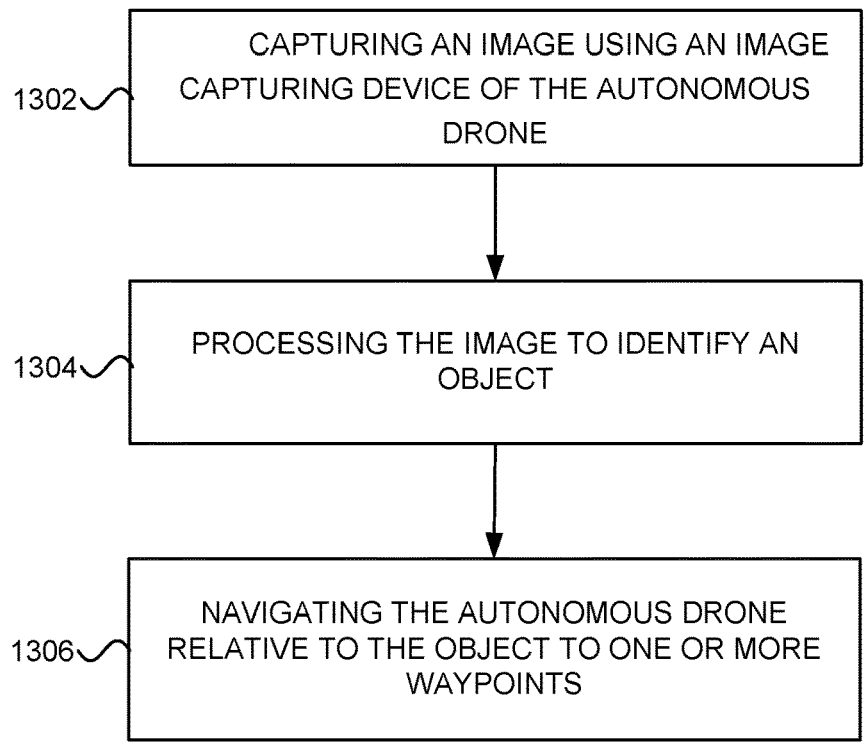
FIG. 13 illustrates a method for stabilization and navigation of an autonomous drone, in accordance with some examples.

FIG. 13 illustrates a method 1300 for stabilization and navigation of an autonomous, in accordance with some examples. The method 1300 begins at operation 1302 with capturing an image using an image capturing device of the autonomous drone. For example, the photography camera 650 of the autonomous drone 710 of FIGS. 10 and 11 captures an image of the face 1002 of the person 1006. The method 1300 continues at operation 1304 with processing the image to identify an object. For example, as discussed in conjunction with FIG. 9 and herein, the face recognition module 970 processes the image from the photography camera 650 to determine whether it contains an initial face 968 and to determine the distance 1004.

The method 1300 continues at operation 1306 with navigating the autonomous drone relative to the object to one or more waypoints. For example, the navigation flight module 962 navigates the autonomous drone 710 of FIG. 12 to waypoint 1 1206 and waypoint 2 1208.

The method 1300 may be performed by one or more devices or apparatuses of devices discussed herein either alone or in conjunction with one another. For example, the autonomous drone 710, messaging system 100, smartphone 708, another device, or an apparatus of the device, may perform the method 1300 either alone or in conjunction with one another. One or more of the operations of method 1300 may be optional. Method 1300 may include one or more additional operations. One or more operations of method 1300 may be performed in a different order.

Machine Architecture

Figure 14:
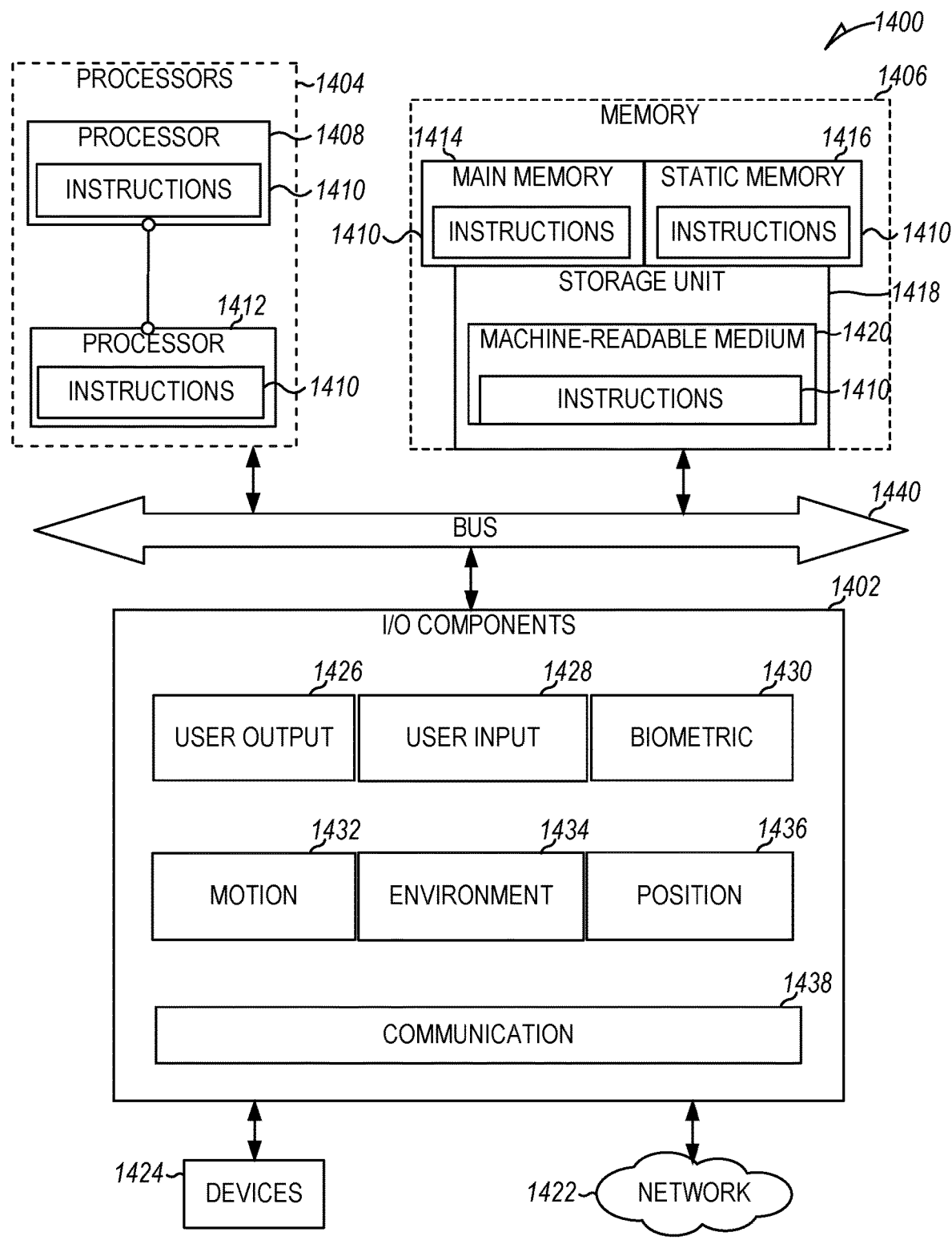
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
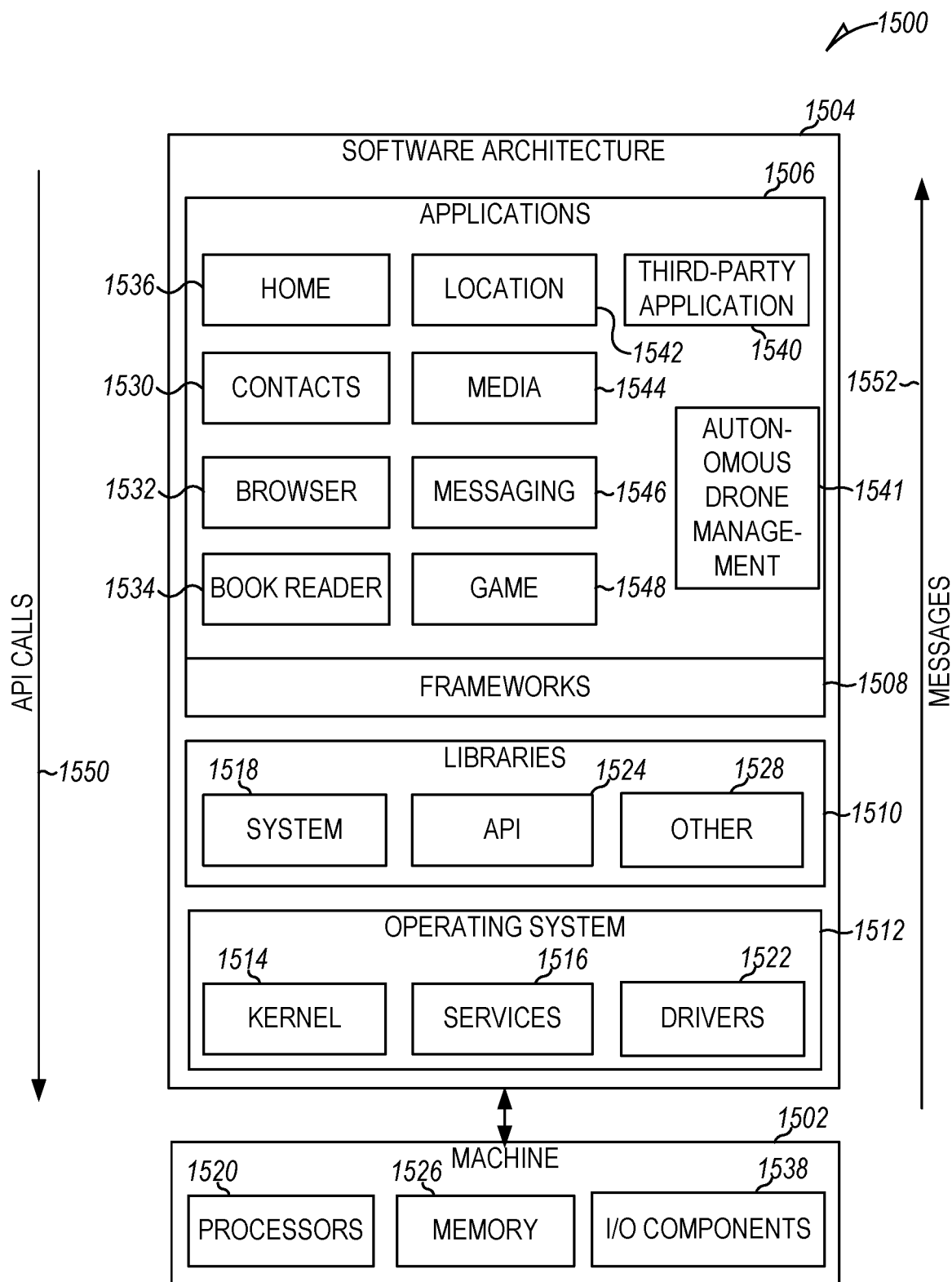
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionalities. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The autonomous drone management 1541 system manages the autonomous drone as disclosed in conjunction with the autonomous drone management system 216 and herein. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
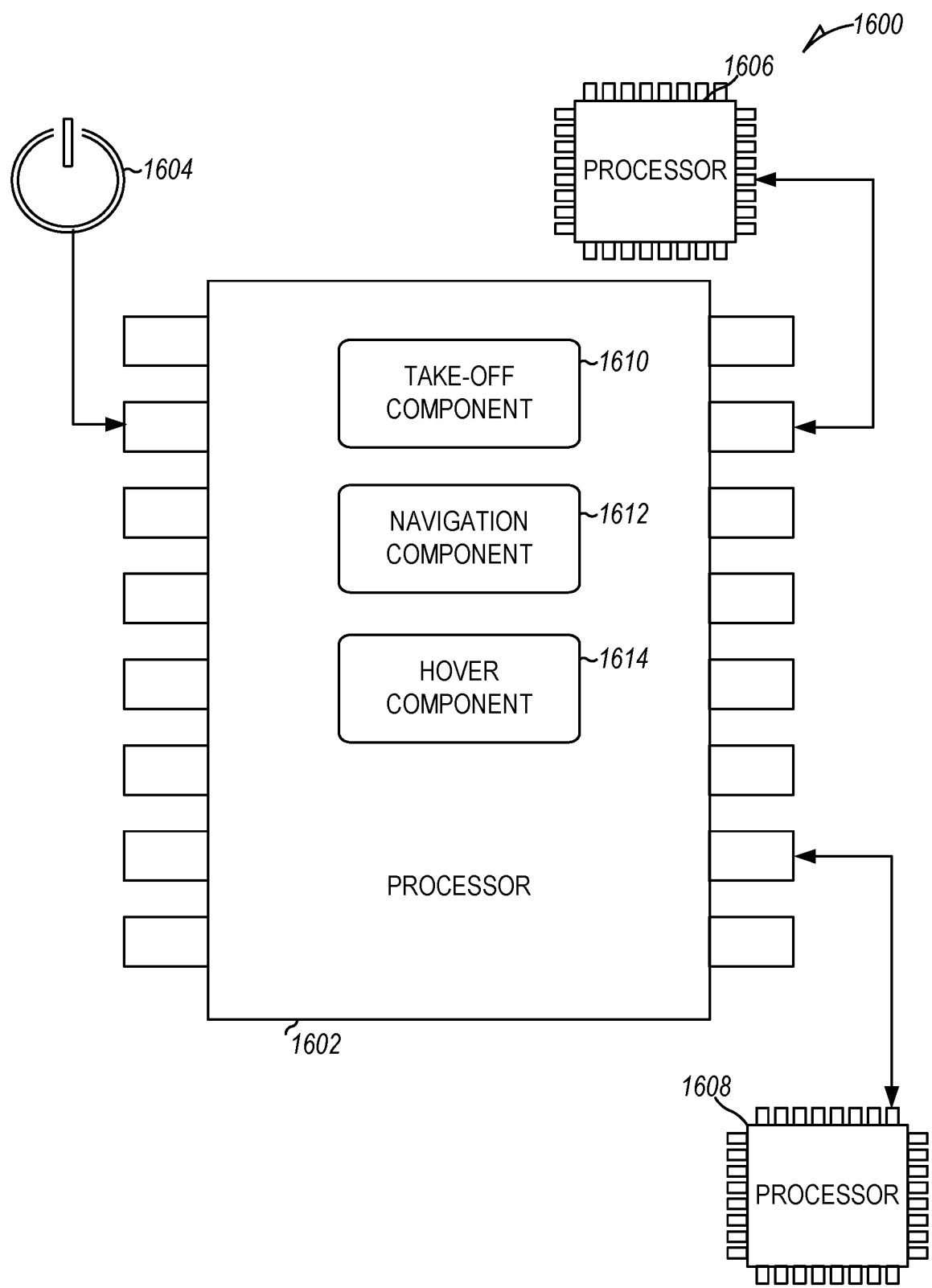
FIG. 16 is a diagrammatic representation of a processing environment, in accordance with some examples.

Turning now to FIG. 16 there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely a take-off component 1610, a navigation component 1612, and a hover component 1614. The take-off component 1610 controls the autonomous drone for taking off. For example, the navigation component 1610 performs the functions described in conjunction with take-off module 966, in accordance with some examples. The navigation component 1612 performs the functions related to navigating the autonomous drone in accordance with a navigation flight module 962. The hover component 1614 managements the hovering of the autonomous drone and performs the functions disclosed in conjunction with hover module 964. The hover component 1614 performs the initial stabilization of the autonomous drone 710 and determines whether it is safe to continue to fly. The processor 1602 is a special purpose processor 1602 designed specifically for the autonomous drone 710, in accordance with some examples. In some examples, the processor 1602 is part of a motherboard with the processor 1602 running a real-time operating system or an operating system such as Linux®. The processor 1602 communicates with other processing circuitry that is included in the autonomous drone 710 such as components 600.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. An apparatus for an autonomous drone comprising:
   at least one processor; and
   a memory storing instructions that, when executed by the at least one processor, configure the processor to perform operations comprising:
   receiving an indication of a selection of a flight button;
   capturing an image using an image capturing device of the autonomous drone;
   processing the image to identify an object;
   determining, based on a number of pixels of an image sensor of the apparatus the object occupies and an estimated size of the object, a distance of the autonomous drone from the object;
   taking off from a hand; and
   navigating, based on the determined distance, the autonomous drone relative to the object to one or more waypoints.

2. The apparatus of claim 1 wherein the object is a person or a face.

3. The apparatus of claim 1 wherein the operations further comprise:
   capturing an additional image at each of the one or more waypoints.

4. The apparatus of claim 1 further comprising:
   a height detector coupled to the at least one processor, the height detector comprising at least one sensor, wherein the operations further comprise:

determining a height above a ground based on sensor data from the at least one sensor, and wherein the navigating is further based on the height above the ground.

5. The apparatus of claim 1 wherein the image is a first image, and wherein the operations further comprise:
capturing a second image using the image capturing device; and
determining whether the object moved based on comparing the first image with the second image.

6. The apparatus of claim 1 wherein the operations further comprise:
hovering at a constant location relative to the object;
determining a windspeed based on an electrical power applied to electrical motors that operate propellers of the autonomous drone; and
in response to determining the windspeed is above a threshold value, landing the autonomous drone.

7. The apparatus of claim 1 wherein the navigating is based on identifying the object in subsequent images captured by the image capturing device.

8. The apparatus of claim 1 wherein the navigating is based on orienting the autonomous drone in space relative to the object.

9. The apparatus of claim 1 wherein the image is a first image and the image capturing device is a first image capturing device, and wherein the operations further comprise:
capturing a second image with a second image capturing device.

10. The apparatus of claim 9 wherein the first image capturing device is mounted horizontally relative to an axis of propellers of the autonomous drone and the second image capturing device is mounted vertically relative to the axis of the propellers and is directed downward.

11. The apparatus of claim 9 wherein the operations further comprise:
processing the second image to determine one or more additional objects, and wherein the navigating is further based on the one or more additional objects.

12. The apparatus of claim 1 wherein the image is a first image and wherein the navigating further comprises:
navigating to a first waypoint based on a first position of the object determined from the first image;
capturing a second image; and
navigating to a second waypoint based on a second position of the object determined from the second image.

13. A method performed on an apparatus for an autonomous drone, the method comprising:
capturing a first image using an image capturing device of the autonomous drone;
processing the first image to identify an object;
capturing a second image using the image capturing device;
determining whether the object moved based on comparing the first image with the second image; and
navigating, based on whether the object moved or not, the autonomous drone relative to the object to one or more waypoints.

14. The method of claim 13 wherein the object is a person or a face, and wherein the method further comprises:
capturing an additional image at each of the one or more waypoints.

15. The method of claim 13 further comprising:
hovering at a constant location relative to the object;
determining a windspeed based on an electrical power applied to electrical motors that operate propellers of the autonomous drone; and
in response to determining the windspeed is above a threshold value, landing the autonomous drone.

16. A non-transitory computer-readable storage medium, the non-transitory computer-readable storage medium including instructions that, when executed by at least one processor of an apparatus for an autonomous drone, cause the at least one processor to perform operations comprising:
capturing an image using an image capturing device of the autonomous drone;
processing the image to identify an object;
hovering at a constant location relative to the object;
determining a windspeed based on an electrical power applied to electrical motors that operate propellers of the autonomous drone;
in response to determining the windspeed is above a threshold value, landing the autonomous drone; and
in response to determining the windspeed is not above the threshold value, navigating the autonomous drone relative to the object to one or more waypoints.

17. The non-transitory computer-readable storage medium of claim 16, wherein the object is a person or a face, and wherein the operations further comprise:
capturing an additional image at each of the one or more waypoints.

18. The non-transitory computer-readable storage medium of claim 16, wherein the image is a first image, and the operations further comprise:
capturing a second image using the image capturing device; and
determining whether the object moved based on comparing the first image with the second image.

19. The non-transitory computer-readable storage medium of claim 16, wherein the image is a first image and the image capturing device is a first image capturing device, and wherein the operations further comprise:
capturing a second image with a second image capturing device.

20. The non-transitory computer-readable storage medium of claim 19, wherein the first image capturing device is mounted horizontally relative to an axis of propellers of the autonomous drone and the second image capturing device is mounted vertically relative to the axis of the propellers and is directed downward.

* * * * *